United States Patent
Olariu et al.

(10) Patent No.: US 7,620,006 B2
(45) Date of Patent: Nov. 17, 2009

(54) METHOD AND APPARATUS FOR PROVIDING QUALITY OF SERVICE GUARANTEES USING STATEFUL MONITORING OF NETWORK LOAD

(75) Inventors: Gabriel L. Olariu, Germantown, MD (US); Roderick Ragland, Rockville, MD (US); Frank Kelly, Walkersville, MD (US)

(73) Assignee: Hughes Network Systems, Inc., Germantown, MD (US)

( * ) Notice: Subject to any disclaimer, the term of this patent is extended or adjusted under 35 U.S.C. 154(b) by 573 days.

(21) Appl. No.: 11/086,001

(22) Filed: Mar. 22, 2005

(65) Prior Publication Data

US 2006/0072581 A1 Apr. 6, 2006

Related U.S. Application Data

(60) Provisional application No. 60/615,897, filed on Oct. 5, 2004.

(51) Int. Cl.
*H04B 7/212* (2006.01)
*H04J 3/16* (2006.01)
(52) U.S. Cl. .................................. 370/322; 370/468
(58) Field of Classification Search ................. 370/322
See application file for complete search history.

(56) References Cited

U.S. PATENT DOCUMENTS

| 5,592,470 A | * | 1/1997 | Rudrapatna et al. ......... 370/320 |
| 5,596,576 A | * | 1/1997 | Milito ........................ 370/450 |
| 6,738,350 B1 | * | 5/2004 | Gao et al. .................... 370/232 |
| 7,333,511 B2 | * | 2/2008 | Sandstrom .................. 370/468 |
| 7,420,917 B2 | * | 9/2008 | Ishikawa et al. ............. 370/232 |
| 2002/0021678 A1 | * | 2/2002 | Heatwole et al. ............ 370/325 |
| 2002/0099854 A1 | * | 7/2002 | Jorgensen ................... 709/249 |
| 2003/0123390 A1 | * | 7/2003 | Takase et al. ............ 370/230.1 |
| 2003/0154272 A1 | * | 8/2003 | Dillon et al. ................ 709/223 |
| 2004/0196788 A1 | * | 10/2004 | Lodha ........................ 370/230 |
| 2009/0157443 A1 | * | 6/2009 | Gracieux ....................... 705/7 |

* cited by examiner

*Primary Examiner*—Ayaz R Sheikh
*Assistant Examiner*—Timothy J Weidner
(74) *Attorney, Agent, or Firm*—K & L Gates, LLP

(57) ABSTRACT

An approach is provided for supporting monitoring of network load. An allocation state is determined based on a bandwidth allocation value, a group load, and a guaranteed portion of capacity of a communication channel. The bandwidth allocation value specifies an actual amount of capacity of the communication channel allocated to one of a plurality of groups of terminals. The group load indicates loads of the terminals belonging to the one group. Capacity of the communication channel is assigned according to the determined allocation state. This arrangement has particular applicability to a satellite network that provides data communication services.

13 Claims, 8 Drawing Sheets

METHOD AND APPARATUS FOR
PROVIDING QUALITY OF SERVICE
GUARANTEES USING STATEFUL
MONITORING OF NETWORK LOAD

RELATED APPLICATIONS

This application is related to, and claims the benefit of the earlier filing date under 35 U.S.C. § 119(e) of, U.S. Provisional Patent Application (Ser. No. 60/615,897) filed Oct. 5, 2004, entitled "Providing Quality of Service Guarantees Using a Stateful Monitoring of the Network Load"; the entirety of which is incorporated herein by reference.

FIELD OF THE INVENTION

The present invention relates to communication systems, and more particularly to monitoring of network load.

BACKGROUND OF THE INVENTION

Communication service providers, from cable to cellular to satellite providers, are ever mindful of the performance and availability of their networks. One key aspect for ensuring high performance and high availability concerns how traffic is engineered. For instance, if certain communication circuits or channels are constantly over-loaded, while others are underutilized, the service provider incurs great costs. That is, because some circuits are oversubscribed, users assigned to these circuits will not have service, and yet, the system does have circuits that are hardly employed, resulting in wasted capacity. Further, this in effect unfairly blocks certain subscribers from obtaining network capacity. Accordingly, communication engineers have invested heavily in developing effective load balancing schemes. As the term suggests, load balancing spreads or equalizes the load across all channels or circuits so that no one channel is over-loaded or under-loaded. Because traffic load is dynamic, varying with time and application, developing a load balancing mechanism that is efficient and ensures fair access to network capacity is difficult. This difficulty stems, in part, from obtaining accurate information on network loading.

Based on the foregoing, there is a clear need for improved approaches for monitoring and determining network load.

SUMMARY OF THE INVENTION

These and other needs are addressed by the present invention, wherein an approach is provided for tracking network load.

According to one aspect of the present invention, a method for tracking loading in a communication system including a plurality of terminals is disclosed. The method includes determining an aggregate load of a sub-set of the terminals, wherein the sub-set is one of a plurality of sub-sets having corresponding service levels. The method also includes comparing the aggregate load with a load level designated for the service level of the one sub-set. Further, the method includes determining a system state of loading of all the sub-sets and allocating capacity of the communication system to the one sub-set according to the system state, if the aggregate load exceeds the designated load level.

According to another aspect of the present invention, an apparatus for tracking loading in a communication system including a plurality of terminals is disclosed. The apparatus includes means for determining an aggregate load of a sub-set of the terminals, wherein the sub-set is one of a plurality of sub-sets having corresponding service levels. The apparatus also includes means for comparing the aggregate load with a load level designated for the service level of the one sub-set. Further, the apparatus includes means for determining a system state of loading of all the sub-sets and for allocating capacity of the communication system to the one sub-set according to the system state, if the aggregate load exceeds the designated load level.

According to yet another aspect of the present invention, a method for supporting monitoring of network load is disclosed. The method includes determining an allocation state based on a bandwidth allocation value, a group load, and a guaranteed portion of capacity of a communication channel, wherein the bandwidth allocation value specifies an actual amount of capacity of the communication channel allocated to one of a plurality of groups of terminals. The group load indicates loads of the terminals belonging to the one group. The method includes assigning capacity of the communication channel according to the determined allocation state.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method, apparatus, and software for monitoring network load in a communication system are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

The present invention, according to one embodiment, provides an approach for tracking un-deterministic network processes that are subject to quality of service agreements. A stateful monitoring process is introduced to capture the dynamics of these highly random network processes, and to quantify their characteristics to fit a feedback load balancing control mechanism. The process determines an aggregate load of a group of the terminals, wherein the group is one of a plurality of groups having corresponding service levels. An excess resource value is determined based on the difference between a bandwidth allocation to a group of terminals and the aggregate load of the group, if the aggregate load is less than a designated load level associated with the service level of the one group. If the aggregate load exceeds the designated load level, the excess resource value is determined based on the difference between the bandwidth allocation to the one sub-set and the designated load level. Capacity is allocated based on the determined excess resource. Under this approach, effective load balancing can be achieved.

Although the present invention is discussed with respect to a satellite communication system, it is recognized by one of ordinary skill in the art that the present invention has applicability to any type of transport network, such as an xDSL (Digital Subscriber Line) system or a cable network supporting a return channel.

Figure 1:
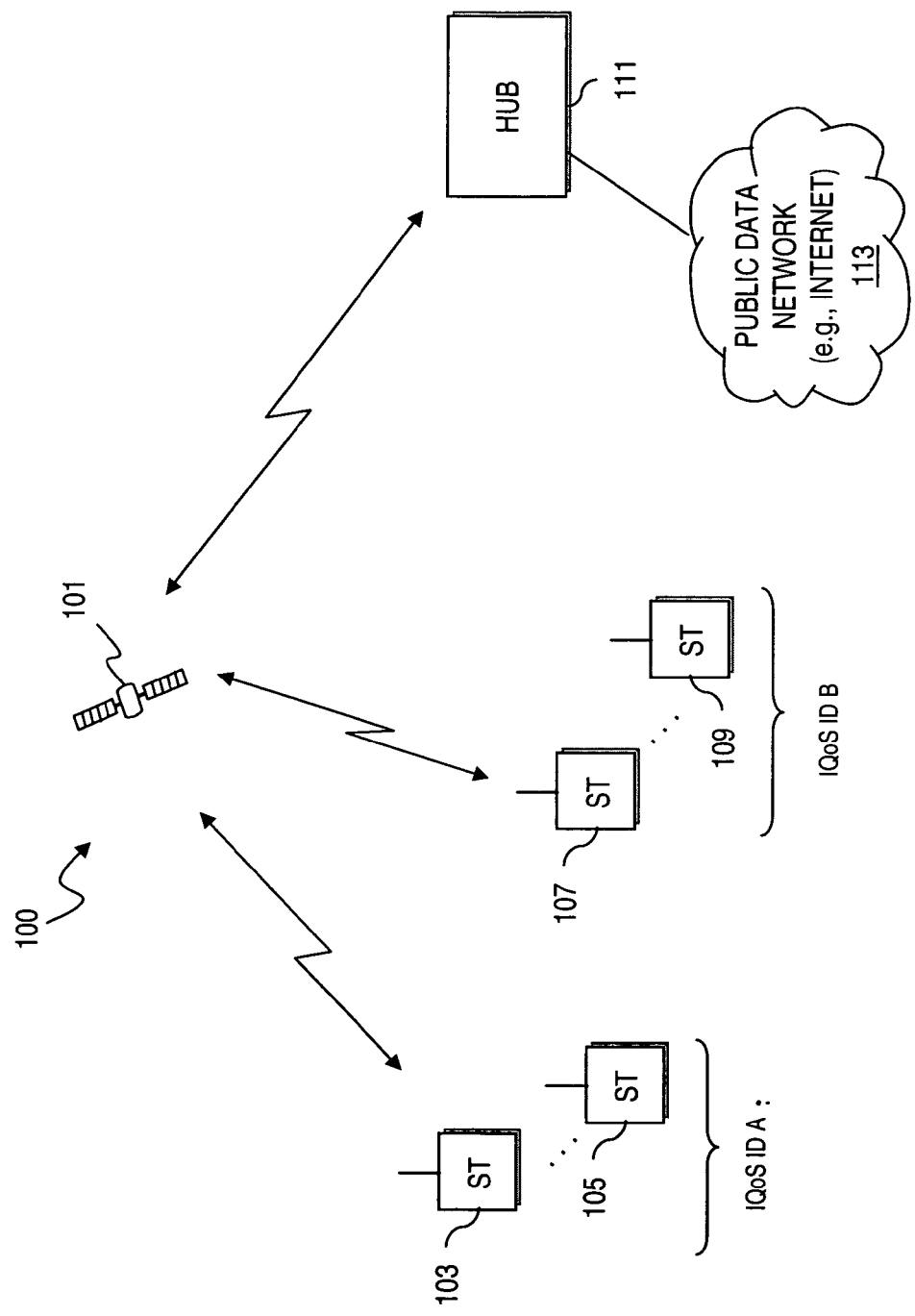
FIG. 1 is a diagram of a communication system capable of supporting stateful monitoring of network load, according to an embodiment of the present invention.

FIG. 1 is a diagram of a communication system capable of supporting stateful monitoring of network load, according to an embodiment of the present invention. A satellite communication system 100 utilizes a satellite 101 to transmit information, bi-directionally, to and from satellite terminals (STs) 103, 105, 107, 109 and a hub 111. In an exemplary embodiment, the STs 103, 105, 107, 109 are Very Small Aperture Terminals (VSAT), and can provide access to a public data network 113, such as the Internet. The hub 111 operates as part of a Network Operations Center (NOC). The present invention, according to one embodiment, the hub 111 determines the load of the individual STs as well as the aggregated load of terminals belonging to a common group, as more fully described in FIGS. 5-7. The grouping can be based on a service plan negotiated with the service provider.

Typically, the various STs 103, 105, 107, 109 are associated with different subscribers. By way of example, STs 103 and 105 are under control of Enterprise A, while STs 107 and 109 belong to Enterprise B. In the system 100, the STs 103, 105, 107, 109 originate traffic from a particular coverage area and may exchange data among themselves as well as other STs (not shown). Each of the terminals 103, 105, 107, 109 uses a contention channel to request bandwidth from the NOC 111, and thereafter transmits data over a collision free (stream) channel. At various points in time, each of the STs 103, 105, 107, 109 has data awaiting transmission; this data is considered the user load. At any given time, the STs 103, 105, 107, 109 can use a single stream channel. A channel load can be defined as a normalized sum of the individual user load.

Figure 2:
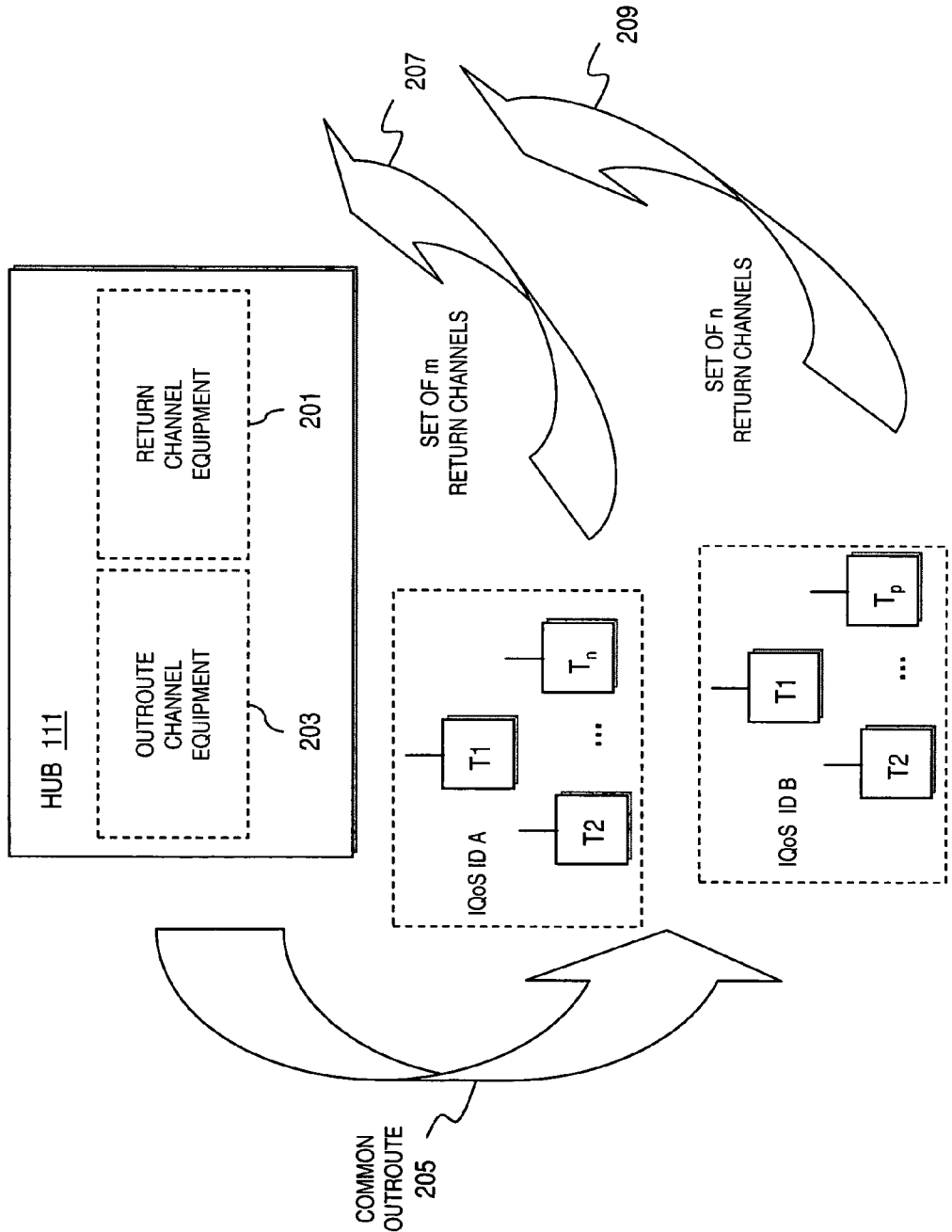
FIG. 2 is a diagram of an architecture of the hub in FIG. 1 for mapping return channel bandwidth to the terminals, according to an embodiment of the present invention.

According to one embodiment of the present invention, each subset of terminals 103, 105, 107, 109, is issued a unique Inroute Quality of Service Identifier (IQoS ID) as part of a service level agreement to establish a "partnership" among the terminals 103, 105, 107, 109. Such an ID is configured in all the terminals that are commissioned, as well as in some of the equipment in the hub 111, e.g., return channel equipment (as shown in FIG. 2). Because each enterprise is likely to require the same quality of service level throughout the enterprise, the STs 103, 105 are assigned an IQoS ID A, and the STs 107, 109 are given an IQoS ID B. Return channel bandwidth is dynamically mapped to customer terminals through, in an exemplary embodiment, messages sent from the hub 111 on the outroute. As used herein, "return channel", "inroute", and "uplink channel" are synonymously used to denote a communication channel established via the satellite 101 to transport data in the direction from the STs 103, 105 to the satellite 101 or the hub 111. The terms "receive channel", "outroute" and "downlink channel" refer to a communication channel carrying traffic in the direction from the satellite 101 or the hub 111 to the STs 103, 105. The system 100 supports an inroute load balancing mechanism that ensures fair access by the STs 103, 105, 107, 109 to the inroutes; this mechanism is more fully described in FIGS. 3, 5A and 5B.

At commissioning, the STs 103, 105, 107, 109 are configured with a set of parameters (which include the IQoS ID) required to access the resource. The hub 111 is responsible for allocating inroute bandwidth, and can do so without any knowledge of the identity of the users that are capable of using the system's resources. This capability enhances scalability in the system 100. Also, the system 100 is secured against unauthorized use through various encryption methods.

Additionally, the system 100 can allow for continuous utilization of the network inroute resources (inroutes or return channels) by multiplexing users of different enterprises on the same set of return channels. The return channel can include multiple carriers, each operating at speeds, for example, of 64 kbps, 128 kbps, or 256 kbps. Each of these carriers is a TDMA (Time Division Multiple Access) stream, which employs several transmission schemes.

The NOC 111 manages and controls communication services and operations. For example, the NOC 111 provisions and identifies the communication channels that are to be allocated. Additionally, the NOC 111 is responsible for controlling the bandwidth that is made available to the STs 103, 105, 107, 109.

Bandwidth on any inroute group (set of inroutes) is available to any terminal that is able to use it. In other words, the STs 103, 105, 107, 109 are totally trusted. The hub 111 does not need to perform the admission control function, or have knowledge of permissible or authorized terminals, as the information, e.g., IQoS ID, is securely loaded into the terminals. This approach provides the advantage that the network of STs 103, 105, 107, 109 can be expanded without any change in the configuration of the return channel equipment within the hub 111.

FIG. 2 is a diagram of an architecture of the hub of FIG. 1 for mapping return channel bandwidth to the satellite terminals, according to an embodiment of the present invention. As shown, the hub 111 of the system 100 includes return channel equipment 201 for interfacing with return channels, as well as outroute channel equipment 203 to transmit signals over an outroute 205 to the terminals associated with IQoS ID A and IQoS ID B. In this example, the outroute 205 is a common channel. By contrast, the terminals utilize different sets of return channels, according to the assigned IQoS ID. Specifically, Enterprise A with IQoS ID A employs a set of m return channels 207, and Enterprise B with IQoS ID B transmits over a set of n return channels 209.

In this example, Enterprise A has n terminals ($T_1, \ldots, T_n$), where each terminal is configured with IQoS ID A. Similarly, Enterprise B has p terminals ($T_1, \ldots, T_p$), each with identifier, IQoS ID B. The hub 111 associates the sets of return channels with the respective identifiers and advertises this mapping via the common outroute 205, using a dedicated outroute messaging protocol. Each set (group) of inroutes is uniquely identified within the system 100 through the identifier.

As previously mentioned, the system 100 can improve utilization of the return channels by multiplexing traffic from terminals associated with different IQoS IDs upon a common set of return channels. This approach thus provides a higher return on investment for the service provider of the system 100 by associating multiple enterprises with the same set of inroutes. Each enterprise is guaranteed a minimum amount of return channel bandwidth and can use more if available (not used by the other parties).

For the purposes of explanation, it is assumed that enterprises 1 and k are sharing the same set of return channels (where k>1); i.e., that of group m. The mapping can be simply represented as a triplet (1, k, m). In an exemplary embodiment, the first two symbols in the triplet represent the start and end of a sorted range of IQoS IDs. Enterprises with IQoS IDs in this range have bandwidth dedicated on inroute group m. Under this scenario, the range is simple, containing only two IQoS IDs. Depending on the amount of bandwidth available on the inroute group and the customer requirements, this range can identify one or more enterprises. Maximum benefits in terms of inroute performance are achieved by identifying enterprises with diverse usage patterns and mapping them to the same set of inroutes.

An enterprise can add more sites and can use the service as soon as the newly installed terminals are correctly configured with the proper IQoS ID. This approach scales up easily because it does not involve any configuration change for the return channel equipment 201 (FIG. 2) of the hub 111.

Figure 3:
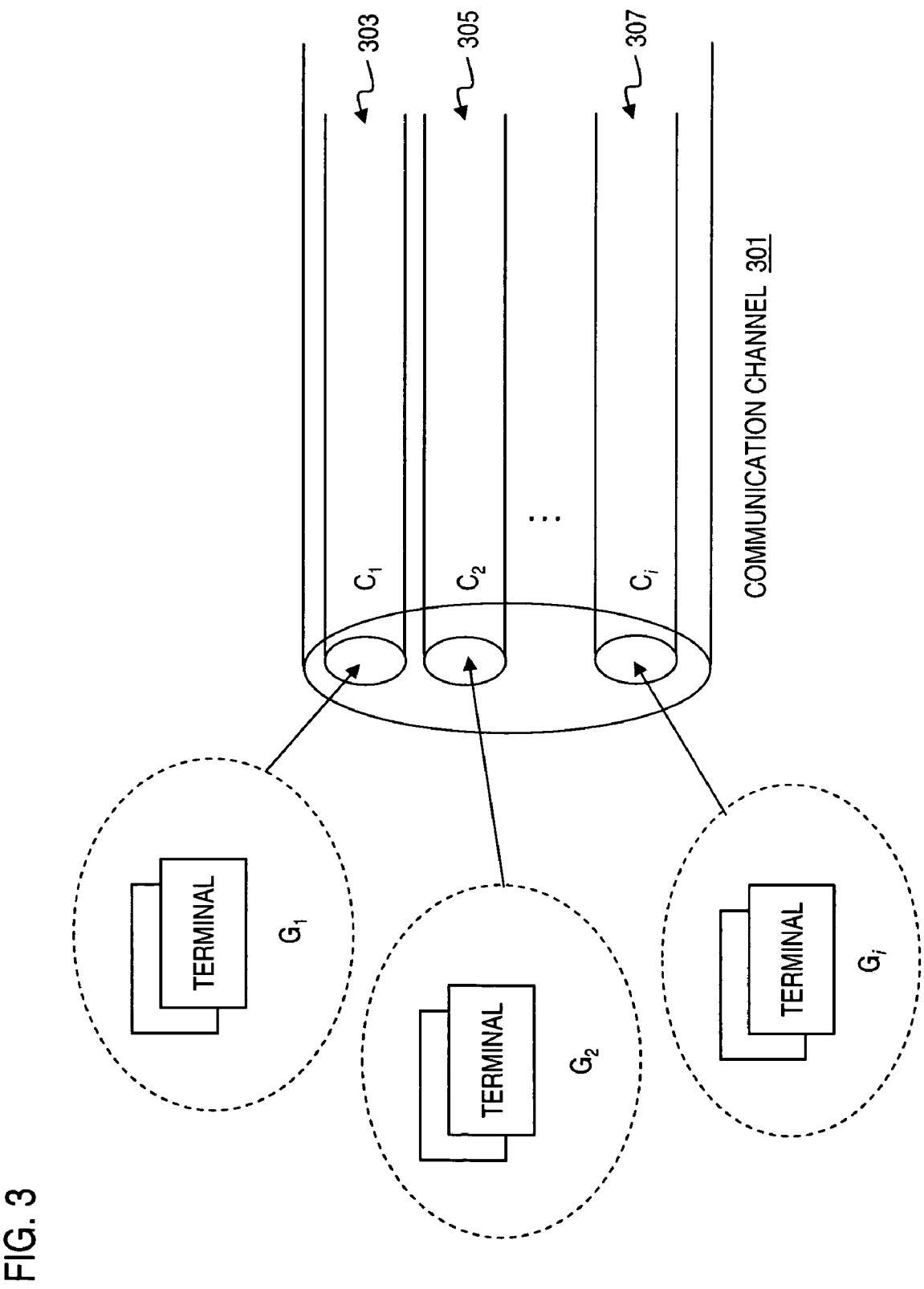
FIG. 3 is a diagram showing the allocation of bandwidth for groups of terminals with varying service plans, according to an embodiment of the present invention.

FIG. 3 is a diagram showing the allocation of bandwidth for groups of terminals with varying service plans, according to an embodiment of the present invention. An arbitrary number of terminals send data over a limited capacity communication channel 301. The transmission media 301, in an exemplary embodiment, is partitioned in sub-channels 303-307. The terminals (e.g., STs 103, 105, 107, 109) can be assigned to sub-channels 303-307 under control from the hub 111.

A terminal can transmit over a single sub-channel at a time, but can be instructed by the hub 111 to change to a different sub-channel. Such switching of inroutes may impose a penalty if the change occurs during active transmission of data. That is, the terminal must halt transmission for a fixed period of time to retune its transmitter for the new sub-channel. As mentioned in FIG. 2, the groups, or subsets of terminals, are defined such that each terminal claims partnership to a distinctly labeled group, such by IQoS ID. The distribution of the number of terminals per group is irrelevant to the determining of loading.

For the purposes of explanation, a simple numeric labeling scheme that associates a unique nonnegative integer to each group (and therefore to each terminal in that group) is used. With this convention, the groups can be referred to as $\{G_i, i \in N\}$, (N is the set of nonnegative integers). A demand-based service policy, as implemented by the hub 111, guarantees a share $C_i$ of the total channel capacity (C) to each group, subject to $$C = \sum_i C_i$$

and such that each $C_i$ is a multiple of the sub-channel capacity. The actual allocation for each group, $B_i$ is a function of the demand (load) as follows:

$$B_i = f(L_i) \text{ such that:} \qquad \text{Eq. (1)}$$

$$\begin{cases} \sum_i B_i = C; \\ B_i \in [0, C], \forall i; \\ B_i = C_i \text{ if } L_i \geq C_i, \forall i. \end{cases}$$

The aggregated load from all the terminals in a group $L_i$, has unknown dynamics—the hub is not equipped with traffic prediction capabilities. A controller located at the hub accounts for the load and actual allocation and determines the excess $E_i$ of resources for each group of terminals:

$$E_i = \begin{cases} B_i - C_i, L_i \geq C_i, \\ B_i - L_i, L_i < C_i. \end{cases}, \forall i. \qquad \text{Eq. (2)}$$

As derived from Eq. (2), $E_i$ is a signed integer with the positive values indicating resource availability, and negative values showing resource shortage. This single variable defines the relationship among the three quantities of interest ($B_i$, $L_i$, $C_i$), and therefore, completely captures the allocation state for a group of terminals. With a total of six possible states, labeled $S_i^j$, $j \in \{1, 6\}$ (FIG. 4), for each group $G_i$ the set of control actions is finite and completely deterministic.

Figure 4:
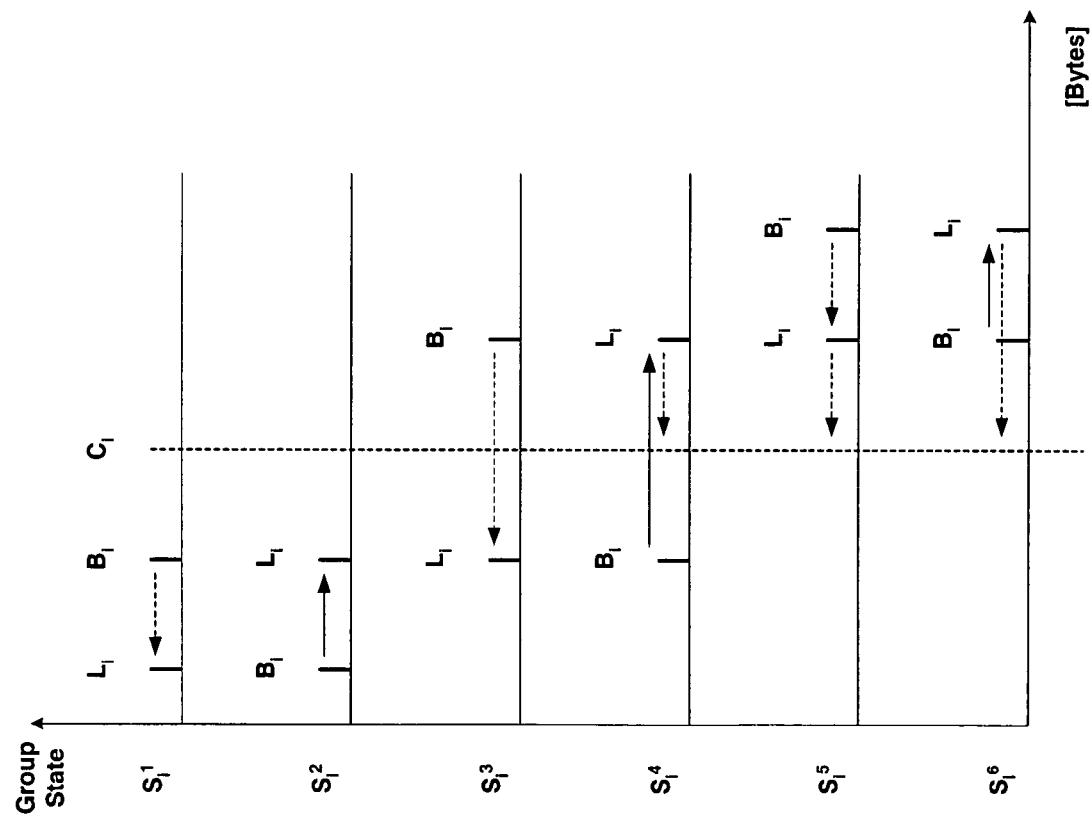
FIG. 4 is a graph of the allocation states for a group of terminals, according to an embodiment of the present invention.

As shown in FIG. 4, a group is said to be under-loaded or in an under-loaded allocation state when its load is less than the guaranteed level of resources (states $S_i^j$, $j \in \{1, \ldots, 3\}$). In this case, the allocation excess is given by the second half of Eq. (2), and future allocations of resources are bound to match the load. When the load on the group is higher than the guaranteed resource level, group is said to be over-loaded or in an over-loaded allocation state (states $S_i^j$, $j \in \{4, \ldots, 6\}$). The allocation excess for a group in this state is calculated with the first part of Eq. (2); as in the under-load states, the future allocations of resources for this group are dependent on the overall state of the system (i.e., loading condition of the communication channel 301).

Figure 5:
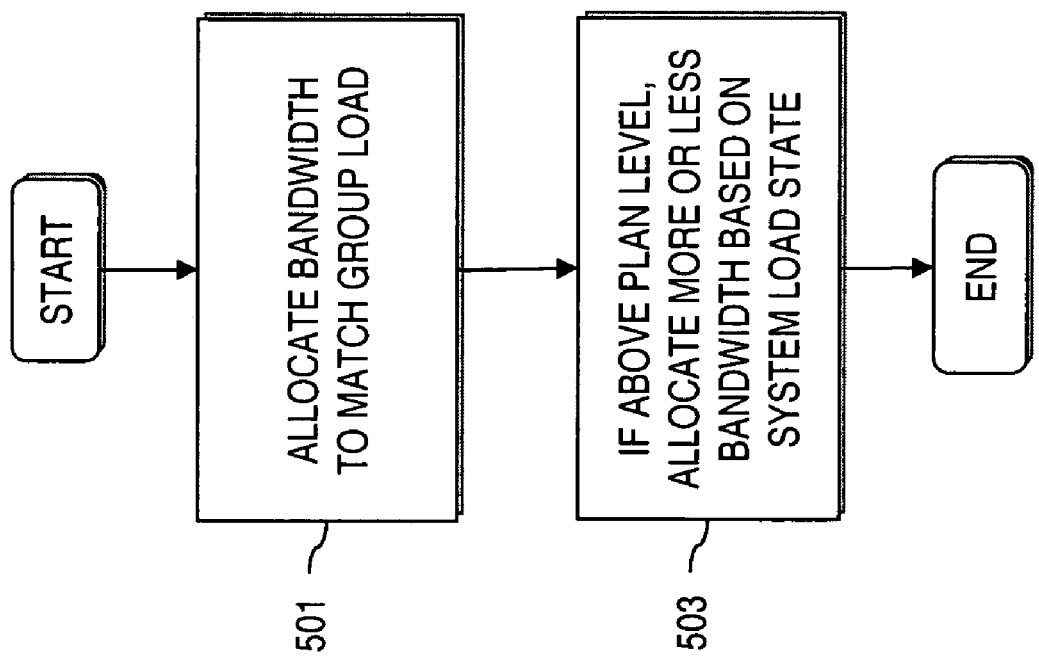
FIG. 5 is a flowchart of a process for allocating bandwidth to a group of terminals, according to an embodiment of the present invention.

FIG. 5 is a flowchart of a process for allocating bandwidth to a group of terminals, according to an embodiment of the present invention. Generally, the hub 111 includes a controller (not shown) that allocates more (solid arrows) or less resources (dashed arrows) ($B_i$) to match the corresponding group load ($L_i$), as in step 501. The specific actions are discussed below in FIG. 6. If the group or aggregate load is above negotiated channel capacity, the hub 111 examines the state of the overall system and allocates accordingly, per step 503.

Figure 6:
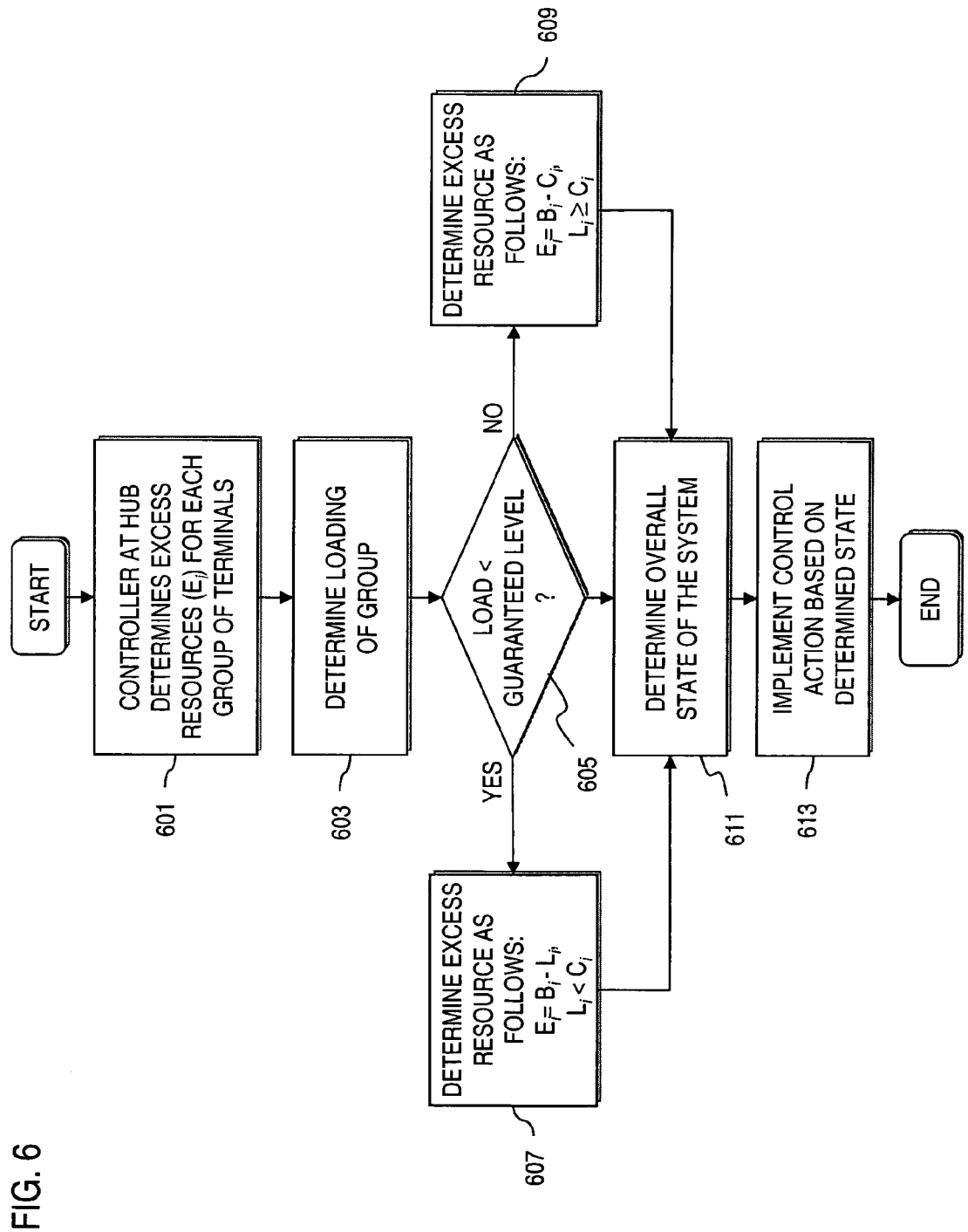
FIG. 6 is a flowchart of the network load monitoring process, in accordance with an embodiment of the present invention.

FIG. 6 is a flowchart of the network load monitoring process, in accordance with an embodiment of the present invention. The controller of the hub 111, as mentioned above, determines the excess resources, $E_i$, for each group of the terminals (step 601). In step 603, the group load is determined. Next, as in step 605, it is determined whether the load is below the guaranteed level of capacity. If the group load does not exceed the guaranteed level, the excess resource is determined, per step 607, according to the difference of the allocation, $B_i$, and the load, $L_i$ (shown in Eq. (2)) However, if the group load meets or exceeds the guaranteed level, the excess resource is computed as the difference between the bandwidth allocation, $B_1$, and the shared capacity value, $C_i$ (step 609).

In step 611, the hub 111 determines the overall system state: (1) all groups of terminals are over-loaded, (2) all groups of terminals are under-loaded, and (3) some of the groups of terminals are over-loaded and some of the groups of terminals are under-loaded (i.e., "mixed environment"). Based on the determined state, the various control actions are performed, as in step 613.

Figure 7:
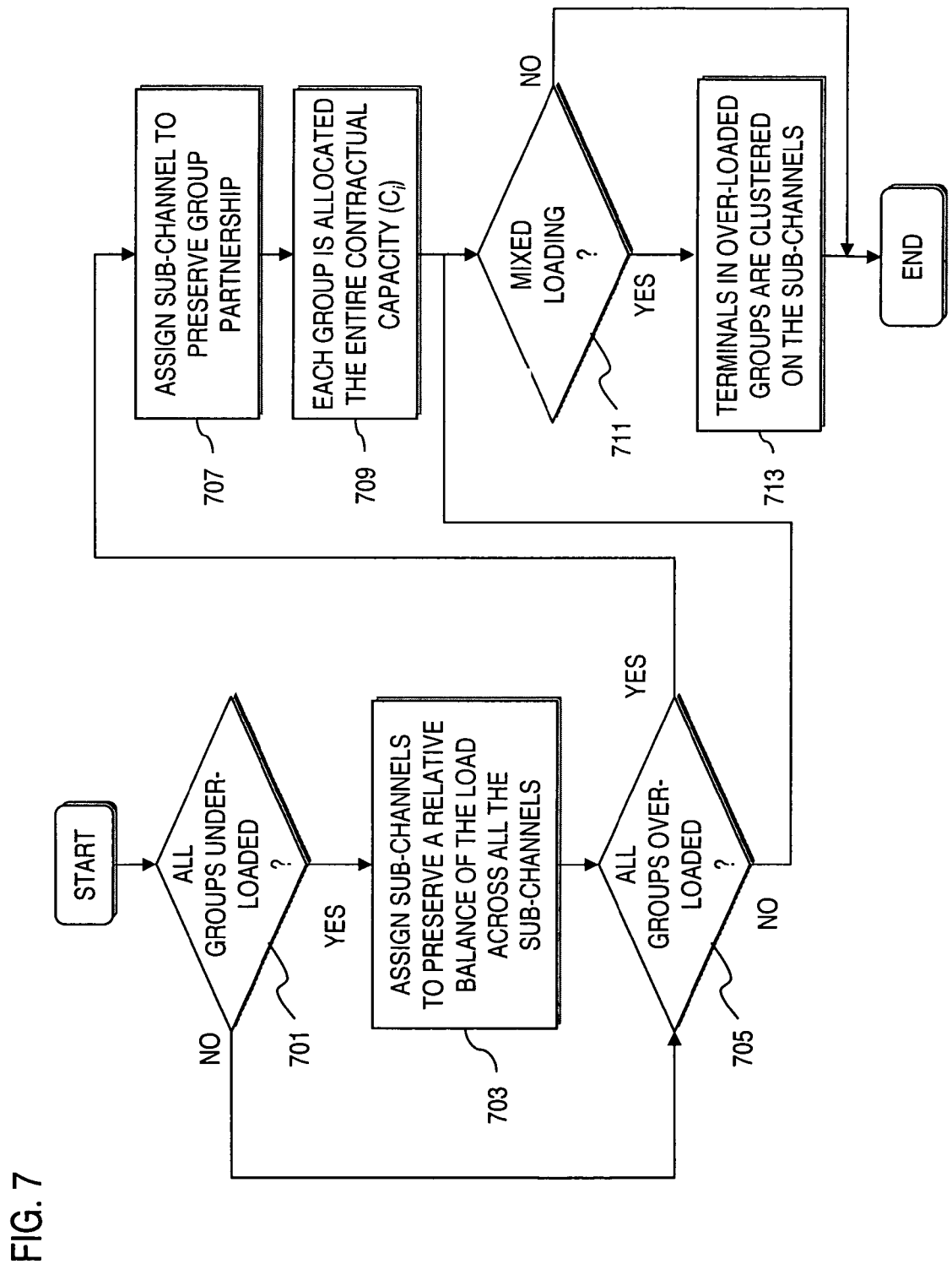
FIG. 7 is a flowchart of the control actions associated with different system states, in accordance with an embodiment of the present invention.

FIG. 7 is a flowchart of the control actions associated with different system states, in accordance with an embodiment of the present invention. In the shared environment of FIG. 3, the states of the different groups are correlated. The controller must determine the overall state of the communication channel from observations of the individual groups. As noted, three system states can be identified, according to one embodiment of the present invention. Per step 701, the hub 111 determines whether all the groups are under-loaded. If so, the sub-channels are assigned to preserve a relative balance of the load across all the sub-channels. In this state, periodically, the terminals that are already active will be reassigned to different inroutes for load balancing purposes. The balancing is done across all sub-channels 303-307 (FIG. 3).

However, if all the groups of terminals are instead over-loaded, as determined in step 705, the sub-channels 303-307 are assigned to preserve the group partnership, per step 707. The terminals of the same group are clustered on the configured number of sub-channels—each group is allocated the entire contractual capacity of the communication channel ($C_i$), as in step 709. In this over-loaded state, the terminals can also be reassigned to other inroutes for load balancing purposes. The balancing is performed across the set of sub-channels used by the terminals from the same group.

In the third system state, the hub 111 determines that the loading is mixed, such that some groups are under-loaded and other groups are over-loaded (as determined in step 711). Under this scenario, the terminals in the over-loaded groups are clustered together on common sub-channels, as in step 713. Clustering can be performed gradually over time, starting with the configured number of sub-channels and adding fractions or full sub-channels to match the group load and without "starving" the other groups. Load balancing actions can occur on the sub-channel cluster, but need not be on a periodic basis.

The above approach advantageously addresses possible unwanted oscillations in the system 100 that would otherwise negatively affect the performance of the bandwidth allocation algorithm.

The process described above provides stateful monitoring of the load of the system 100. The processes detailed above can be executed through a variety of hardware and/or software configurations.

Figure 8:
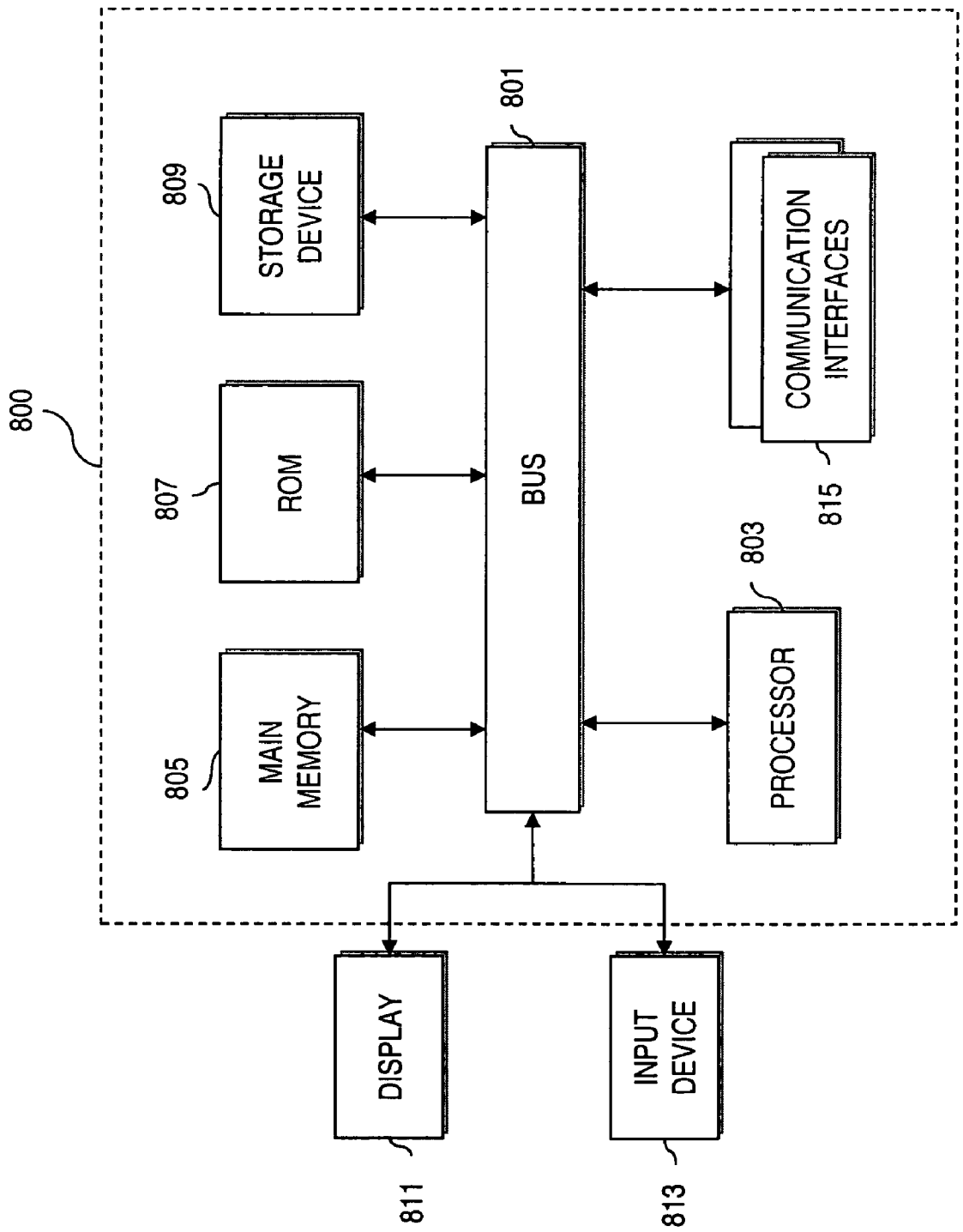
FIG. 8 is a diagram of hardware that can be used to implement an embodiment of the present invention.

FIG. 8 illustrates a computer system 800 upon which an embodiment according to the present invention can be implemented. The computer system 800 includes a bus 801 or other communication mechanism for communicating information, and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions to be executed by the processor 803. The computer system 800 further includes a read only memory (ROM) 807 or other static storage device coupled to the bus 801 for storing static information and instructions for the processor 803. A storage device 809, such as a magnetic disk or optical disk, is additionally coupled to the bus 801 for storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is cursor control 815, such as a mouse, a trackball, or cursor direction keys for communicating direction information and command selections to the processor 803 and for controlling cursor movement on the display 811.

According to one embodiment of the invention, the processes of FIGS. 5-7 are provided by the computer system 800 in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the present invention. Thus, embodiments of the present invention are not limited to any specific combination of hardware circuitry and software.

The computer system 800 also includes a communication interface coupled to bus 801. The communication interface provides a two-way data communication coupling to a network link connected to a local network. For example, the communication interface may be a digital subscriber line (DSL) card or modem, an integrated services digital network (ISDN) card, a cable modem, or a telephone modem to provide a data communication connection to a corresponding type of telephone line. As another example, communication interface may be a local area network (LAN) card (e.g. for Ethernet™ or an Asynchronous Transfer Model (ATM) network) to provide a data communication connection to a compatible LAN. Wireless links can also be implemented. In any such implementation, communication interface sends and receives electrical, electromagnetic, or optical signals that carry digital data streams representing various types of information. Further, the communication interface can include peripheral interface devices, such as a Universal Serial Bus (USB) interface, a PCMCIA (Personal Computer Memory Card International Association) interface, etc.

The network link typically provides data communication through one or more networks to other data devices. For example, the network link 819 may provide a connection through a local network to a host computer, which has connectivity to a network (e.g. a wide area network (WAN) or the global packet data communication network now commonly referred to as the "Internet") or to data equipment operated by service provider. The local network and network both use electrical, electromagnetic, or optical signals to convey information and instructions. The signals through the various networks and the signals on network link and through communication interface, which communicate digital data with computer system, are exemplary forms of carrier waves bearing the information and instructions.

The computer system 800 can send messages and receive data, including program code, through the network(s), network link, and communication interface 815. In the Internet example, a server (not shown) might transmit requested code belonging to an application program for implementing an embodiment of the present invention through the network, local network and communication interface 815. The processor 803 may execute the transmitted code while being received and/or store the code in storage device 809, or other non-volatile storage for later execution. In this manner, computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as storage device 809. Volatile media include dynamic memory, such as main memory 805. Transmission media include coaxial cables, copper wire and fiber optics, including the wires that comprise bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the above approach provides for stateful monitoring of network load. An aggregate load of a group of the terminals is determined, wherein the group is one of a plurality of groups having corresponding service levels. An excess resource value is determined based on the difference between a bandwidth allocation to a group of terminals and the aggregate load of the group, if the aggregate load is less than a designated load level associated with the service level of the one group. If the aggregate load exceeds the designated load level, the excess resource value is determined based on the difference between the bandwidth allocation to the one sub-set and the designated load level. Capacity is allocated based on the determined excess resource. Under this approach, effective load balancing can be achieved.

While the present invention has been described in connection with a number of embodiments and implementations, the present invention is not so limited but covers various obvious modifications and equivalent arrangements, which fall within the purview of the appended claims.

What is claimed is:

1. A method for tracking loading in a communication system including a plurality of terminals, the method comprising:
   a hub determining an aggregate load of a sub-set of the terminals, wherein the sub-set is one of a plurality of sub-sets having corresponding service levels;
   the hub comparing the aggregate load with a load level designated for the service level of the one sub-set;
   the hub determining a system state of loading of all the sub-sets and allocating capacity of the communication system to the one sub-set according to the system state, if the aggregate load exceeds the designated load level;
   the hub determining an excess resource value based on a difference between a bandwidth allocation to the one sub-set and the aggregate load, if the aggregate load is less than the designated load level; and
   the hub determining the excess resource value based on a difference between the bandwidth allocation to the one sub-set and the designated load level, if the aggregate load exceeds the designated load level,
   wherein the allocated capacity is based on the determined excess resource.

2. A method according to claim 1, wherein the system state includes a first state whereby all the sub-sets are under-loaded, a second state whereby all the sub-sets are over-loaded, and a third state whereby a portion of the sub-sets are over-loaded,
   in the first state, the allocated capacity preserves a balance of loads across sub-channels of a communication channel of the communication system,
   in the second state, the allocated capacity preserves partnership of the one sub-set of terminals,
   in the third state, sub-sets that are over-loaded are clustered onto common sub-channels.

3. A method according to claim 1, wherein the communication system is a satellite network, and the allocated capacity is capacity of a plurality of inroutes of the satellite network.

4. A method according to claim 3, wherein the inroutes are Time Division Multiple Access (TDMA) streams.

5. A computer-readable storage medium bearing instructions for tracking loading in a communication system including a plurality of terminals, the instructions executable by a processor to perform:
   determining an aggregate load of a sub-set of the terminals, wherein the sub-set is one of a plurality of sub-sets having corresponding service levels;
   comparing the aggregate load with a load level designated for the service level of the one sub-set; and
   determining a system state of loading of all the sub-sets and allocating capacity of the communication system to the one sub-set according to the system state, if the aggregate load exceeds the designated load level;
   determining an excess resource value based on a difference between a bandwidth allocation to the one sub-set and the aggregate load, if the aggregate load is less than the designated load level; and
   determining the excess resource value based on a difference between the bandwidth allocation to the one sub-set and the designated load level, if the aggregate load exceeds the designated load level, wherein the allocated capacity is based on the determined excess resource.

6. An apparatus for tracking loading in a communication system including a plurality of terminals, the apparatus comprising:
 means for determining an aggregate load of a sub-set of the terminals, wherein the sub-set is one of a plurality of sub-sets having corresponding service levels;
 means for comparing the aggregate load with a load level designated for the service level of the one sub-set; and
 means for determining a system state of loading of all the sub-sets and for allocating capacity of the communication system to the one sub-set according to the system state, if the aggregate load exceeds the designated load level;
 means for determining an excess resource value based on a difference between a bandwidth allocation to the one sub-set and the aggregate load, if the aggregate load is less than the designated load level; and
 means for determining the excess resource value based on a difference between the bandwidth allocation to the one sub-set and the designated load level, if the aggregate load exceeds the designated load level,
 wherein the allocated capacity is based on the determined excess resource.

7. An apparatus according to claim 6, wherein the system state includes a first state whereby all the sub-sets are under-loaded, a second state whereby all the sub-sets are over-loaded, and a third state whereby a portion of the sub-sets are over-loaded and another portion of the sub-sets are under-loaded,
 in the first state, the allocated capacity preserves a balance of loads across sub-channels of a communication channel of the communication system,
 in the second state, the allocated capacity preserves partnership of the one sub-set of terminals,
 in the third state, sub-sets that are over-loaded are clustered onto common sub-channels.

8. An apparatus according to claim 6, wherein the communication system is a satellite network, and the allocated capacity is capacity of a plurality of inroutes of the satellite network.

9. An apparatus according to claim 8, wherein the inroutes are Time Division Multiple Access (TDMA) streams.

10. A method for supporting monitoring of network load, the method comprising:
 a hub determining an allocation state based on a bandwidth allocation value, a group load, and a guaranteed portion of capacity of a communication channel, wherein the bandwidth allocation value specifies an actual amount of capacity of the communication channel allocated to one of a plurality of groups of terminals, the group load indicating loads of the terminals belonging to the one group;
 assigning capacity of the communication channel according to the determined allocation state; and
 the hub determining a system state based on the allocation states of the groups, the system state being one of all the groups are over-loaded, all the groups are under-loaded, or a portion of the groups are over-loaded,
 if all the groups are under-loaded, the capacity is assigned to preserve a balance of loads across sub-channels of the communication channel,
 if all the groups are over-loaded, the capacity is assigned to preserve respective partnerships of the groups,
 if a portion of the groups are over-loaded, the capacity is assigned such that the groups that are over-loaded are clustered onto common sub-channels of the communication channel.

11. A method according to claim 10, wherein the communication channel is an inroute established over a satellite.

12. A method according to claim 11, wherein the inroute is a Time Division Multiple Access (TDMA) stream.

13. A computer-readable storage medium bearing instructions for supporting monitoring of network load, the instructions executable by a processor to perform:
 determining an allocation state based on a bandwidth allocation value, a group load, and a guaranteed portion of capacity of a communication channel, wherein the bandwidth allocation value specifies an actual amount of capacity of the communication channel allocated to one of a plurality of groups of terminals, the group load indicating loads of the terminals belonging to the one group;
 assigning capacity of the communication channel according to the determined allocation state; and
 determining a system state based on the allocation states of the groups, the system state being one of all the groups are over-loaded, all the groups are under-loaded, or a portion of the groups are over-loaded,
 if all the groups are under-loaded, the capacity is assigned to preserve a balance of loads across sub-channels of the communication channel,
 if all the groups are over-loaded, the capacity is assigned to preserve respective partnerships of the groups,
 if a portion of the groups are over-loaded, the capacity is assigned such that the groups that are over-loaded are clustered onto common sub-channels of the communication channel.

* * * * *